(No Model.)
A. GIPPERICH.
ART OF DETERMINING THE VALUE OF ELECTRIC, MAGNETIC, OR ELECTRO MAGNETIC FORCES BY WEIGHT.
No. 400,662. Patented Apr. 2, 1889.
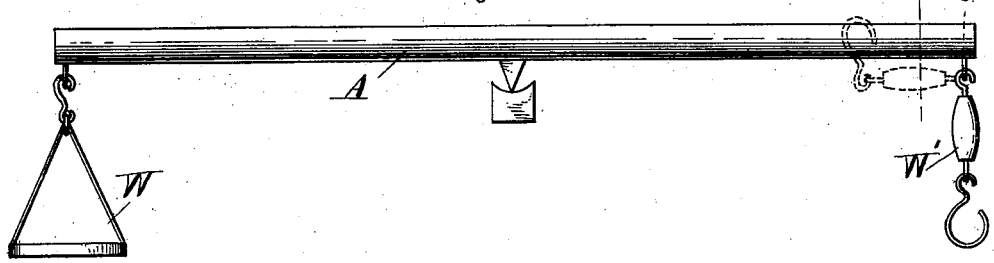
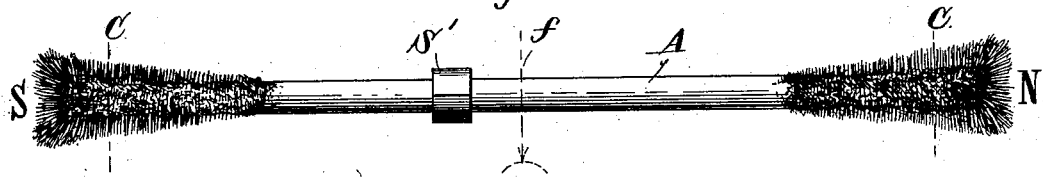
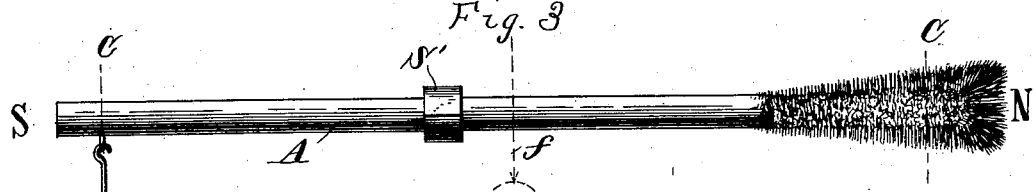
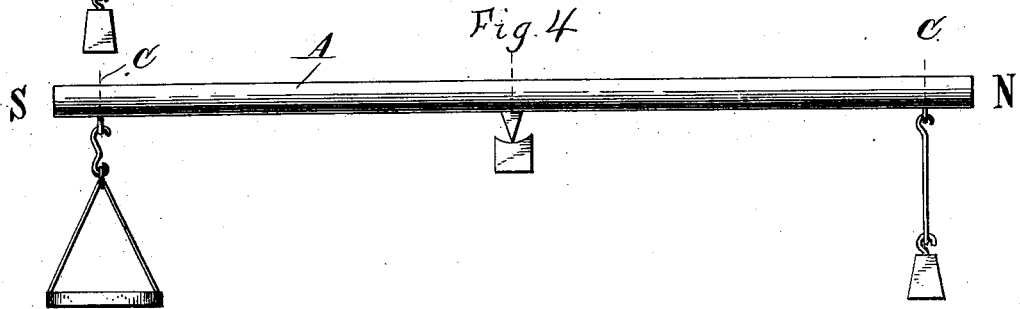
Witnesses:
J. Thomson Cross
Milt. E. Rouzee
Inventor:
Adolphus Gipperich.
per Henry Orth
Attorney.

UNITED STATES PATENT OFFICE.

ADOLPHUS GIPPERICH, OF RICHMOND, VIRGINIA.

ART OF DETERMINING THE VALUE OF ELECTRIC, MAGNETIC, OR ELECTRO-MAGNETIC FORCES BY WEIGHT.

SPECIFICATION forming part of Letters Patent No. 400,662, dated April 2, 1889.

Application filed September 25, 1888. Serial No. 286,372. (No model.)

*To all whom it may concern:*

Be it known that I, ADOLPHUS GIPPERICH, a citizen of the United States, residing at Richmond, in the county of Henrico and State of Virginia, have invented certain new and useful Improvements in the Art of Determining the Value of Electro-Magnetic Forces by Weight; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the art of determining the value of electric, magnetic, or electro-magnetic forces by weight; and it consists, first, in the method or process of weighing such forces, and, secondly, as absolutely necessary steps in the said method or process, the method or process of standardizing the scale-beams by uniformly magnetizing or charging the same to produce instruments of uniform value.

In the accompanying drawings, Figures 1, 2, 3, and 4 are views of a scale-beam illustrating the process of determining the point of leverage of a balanced polarized body or scale-beam.

In instruments as heretofore constructed for determining by weight the value of electric, magnetic, or electro-magnetic forces the fact that such forces do not influence a magnetized or polarized scale-beam uniformly, and the further fact that terrestrial magnetism is a potent factor in weighing such forces, had to be ignored simply for want of means to take these into proper consideration and determine their value.

All such instruments as heretofore constructed or proposed must necessarily give erroneous results.

That my invention may be fully understood I will describe the same in detail, reference being had to the accompanying drawings.

The first step in the construction of an instrument in which a polarized scale-beam is employed for determining the value of electric or magnetic or electro-magnetic forces is to choose a scale-beam of substantially uniform sectional area throughout. For this purpose I employ a round bar of steel, A, which I will hereinafter call the scale-beam. The next step is to counterpoise the scale-beam accurately on knife-edges and then magnetize or polarize the beam in any usual, well-known, or preferred manner. The third step is to ascertain the center of attraction or the point of leverage of the scale-beam. This is one of the most important steps in the process of weighing forces of the nature referred to for the reason that the force of attraction in a magnetized or polarized bar is not uniformly distributed throughout the length thereof. Let, for instance, A, Fig. 1, be a perfectly-equilibrated non-polarized scale-beam, the weights W and W' being of the same value. Now let W' be placed in the position shown in dotted lines, thereby shifting the center of gravity thereof from $c$ to $c'$, nearer to the fulcrum. It is obvious that W would not now counterbalance W'. Let a magnetized or polarized body be embedded in iron filings and withdrawn, and it will be found that these filings will arrange themselves somewhat as shown in Figs. 2 and 3, showing conclusively that the center of attraction is at a point intermediate the extremes and the fulcrum $f$ of the two limbs of the scale-beam. It is obvious, therefore, that counterpoises suspended at any point outside of the center of attraction, although it may be a perfect counterpoise, will not express the value of the force counterpoised thereby, since a magnetic, electric, or electro-magnetic force will exert its power on a magnetized bar according to the magnetism stored and distributed therein, as shown by the distribution of the filings thereon, and consequently exert its force on a lever that may be shorter or longer than that at which such counterpoise is suspended. Thus, for instance, let a polarized scale-beam, A, be placed on a line at right angles to the magnetic meridian. The current of terrestrial magnetism being in a vertical direction the beam will at once tend to place itself parallel with the current with its north pole down and south pole up. It is proposed to determine the value of this force by weight. If a weight is suspended from the point $c$ at the south pole, so as to counterbalance the force exerted on the beam, will this weight indicate the true value of these forces? Evidently not, since the center of attraction is not at $c$ on the north-pole end of the beam, but at a point much nearer the fulcrum, as at C, for instance; and we have here the same result as described with reference to the non-polarized beam Fig 1 and weights W W' when the latter is placed in the position shown in dotted lines.

The importance of ascertaining the center of attraction is therefore self-evident, as it constitutes in the polarized scale-beam the points of leverage or lengths of lever-arms from which the gravital force must be suspended in order to indicate by its weight the true value of a magnetic or electro-magnetic force exerted upon such a beam.

The mode of ascertaining the center of attraction will now be described.

The polarized scale-beam is first neutralized or counterbalanced against the influence of terrestrial magnetism by first placing it on a line east and west, so as to swing in a plane at right angles to the magnetic meridian. Under the magnetic force exerted on the beam the latter will have a tendency to place itself parallel with the current, with its north pole down and south pole up. This tendency of the scale-beam I neutralize by counterpoising the force of terrestrial magnetism. This I affect by means of a split sleeve, S', which is slipped upon the south limb of the scale-beam. Said sleeve shoud be of such a weight as to counterpoise the force of terrestrial magnetism when shifted to a point near the fulcrum of the beam to leave the ends of the limbs free. The sleeve is split to clamp the beam tightly, so that when adjusted to hold said beam in a perfectly horizontal or equilibrated position it cannot be displaced. The beam is them embedded in iron filings—that is to say, I load the beam with all the iron filings its force of attraction is capable of holding—and then remove and carefully weigh the load. This operation is repeated and the average of the several loads calculated. This will give the average force of attraction of the beam. Now supposing that five loads will give an aggregate of one hundred milligrams, or an average of twenty milligrams, this will give an average attractive force of ten milligrams for each pole. I again load the beam and remove the load from the south limb only and set the beam on its knife-edge supports on a line due east and west, so as to swing in a plane at right angles to the magnetic meridian, and suspend from said south limb a weight equal to ten milligrams at a point where it will counterbalance the load on the north limb, which point of suspension for the weight will give the center of attraction, C, or point of leverage of both limbs of the beam. Having thus ascertained the centers of attraction of both limbs of the beam, the filings on the north limb are removed, and the point of suspension of the weight on the south limb measured and laid out on the north limb, so that both points will be equidistant from the fulcrum of the beam. From these points so obtained the scale-pans will be suspended, which scale-pans must of course be of like weight and counterbalance each other exactly. The scale-pans, having been found to exactly counterbalance each other, are then removed, together with the counter-balance S', for the force of terrestrial magnetism, the scale-pans again suspended from the beam, and sufficient weight added to the pan on the south limb to again counterbalance the force of terrestrial magnetism. A scale-beam is thus obtained that is not only absolutely accurately counterpoised, but also neutralized as against the force of terrestrial magnetism on a line east and west, or a line at right angles to the magnetic meridian. This added weight, of course, is now a known quantity and will accurately indicate the value of the force of terrestrial magnetism, and is therefore a standard of comparison in weighing all other magnetic, electric, or electro-magnetic forces. The scales are now ready for weighing such forces, which are made to influence the scale-beam in a manner similar to that of terrestrial magnetism, or in a vertical direction with their south pole up and north pole down and perpendicular to the center of attraction either of the north or south pole of the scale-beam—that is to say, the forces to be weighed may be made to influence either the south or the north pole of the scale-beam. The forces exerted upon the scale-beam are then simply an augmentation of the force of terrestrial magnetism, and the plus weight necessary to counterbalance the beam against the influence of such forces will necessarily indicate their value.

In practical use the scale-beam of the instrument must lie in a plane east and west, as intimated above, or in a plane at right angles to the magnetic meridian, because in that position alone the beam is neutralized as to the influence of terrestrial magnetism, performing, in fact, the functions of ordinary scales. Placed in any other plane the scale would not be as sensitive, as the horizontal force of terrestrial magnetism acting on the beam would tend to hold it horizontal and act in a manner similar to the gravital force exerted by the tongue. If the instrument is to be adapted for weighing in other planes, a non-polarized scale-beam must be combined with the polarized body, the former acting on a horizontal line while the polarized body is set with its poles at right angles to the direction of the magnetic force, whatever the angle of force might be. The mode of neutralizing a polarized body when such body swings in the plane of the magnetic meridian or in other planes has been fully described in an application for patent for an apparatus for determing the value of electric, magnetic, or electro-magnetic forces, filed about January 24, 1888, Serial No. 261,731, and need not be described further herein, as one example will suffice to show how such a body may be neutralized as against terrestrial magnetic influence in order to obtain absolutely correct results.

I would here also remark that in instruments for weighing forces of some magnitude the scale-beam will be the most convenient, the instrument described in the application above referred to being more especially designed for weighing forces of comparatively limited power.

It is well-known that the force of terrestrial magnetism varies from the magnetic equator to the magnetic poles, yet an instrument prepared according to the processes above referred to can be utilized at any point by simply adding or reducing the weight on the south limb where found that the terrestrial magnetic force is greater or less than that to which the instrument is adjusted. In practice, however, the force of terrestrial magnetism is counterbalanced wherever the instrument may be brought into use by simply placing sufficient weight in the scale-pan on the south limb to counterbalance the beam as against the terrestrial magnetism of the locality where the instrument is used. In order, however, to obtain standard instruments that will give the same results in any longitude or latitude it is necessary that such instruments should be adjusted to a standard magnetic power. The attractive forces being mutual, it is obvious that when this power varies the results must vary also, and as the force of terrestrial magnetism varies with the longitudes, and more so with the latitudes, it is further necessary that a standard point or points on the globe be selected where the balance-beams are magnetized. For instance, localities having the same angles of inclination and intensity may be chosen, for the reason that the vertical force of terrestrial magnetism against which the polarized scale-beam is neutralized or counterbalanced, and to which it is standardized, will be the same in these localities, or substantially the same, the slight variations in such magnetism as the periodically-recurring oscillating variations and disturbances of short duration may be ignored in instruments designed for practical uses. Let it be supposed that Washington, D. C., is selected as the point where the instruments are to be standardized, and that with a scale-beam of given magnetic power the force of terrestrial magnetism equals 0.180 grams when said beam lies in a plane east and west. All the scale-beams of the instruments will then be magnetized to such an extent that 0.180 grams will counterbalance the force of terrestrial magnetism, the centers of attraction or points of leverage in each scale-beam having been previously determined, as above described, since such centers of attraction will vary with the capacity of each scale-beam of storing magnetism, the said capacity being governed by the temper or hardness of the steel of which such beam is constructed, notwithstanding the fact that all such beams are of exactly the same length and sectional area. When so adjusted, the instruments may be used in any longitude or latitude, the force to be weighed being made to influence the scale-beam in the same manner as the force of terrestrial magnetism, as above stated. The results obtained will be in true proportion to the forces of terrestrial magnetism in Washington, D. C., in all such standardized instruments. If therefore a scale-beam is magnetized, its centers of attraction or leverage ascertained, and it is found that 0.180 grams are insufficient to counterbalance the force of terrestrial magnetism, demagnetization is resorted to, while should the force exerted by the 0.180 grams be too great further magnetization will be necessary until the 0.180 grams exactly counterbalance the force of terrestrial magnetism. To increase the magnetic power of a scale-beam need not be described, the proceeding being the same as when such a beam is magnetized in the first instance, and is well known.

To partially demagnetize a scale-beam when the induced magnetism in the same is above the standard force—as, for example, 0.180 grams—I have found that the simplest mode is to pass one of the poles of the induction-magnet by an undulatory or wavy motion of about one-half a second duration in proximity to the like pole of the magnetized beam, this being continued until said beam assumes a perfectly horizontal position under the standard weight of 0.180 grams. By this means magnetic scales may also be kept at a standard point of magnetization, since any loss of magnetic power will at once be apparent by the position of the beam on its knife-edges, which position will be more or less at an angle to the horizontal, according to the loss in power, which loss may be made good by remagnetizing. The same is the case when the beam from any cause becomes more highly charged, when demagnetization, as above described, is resorted to.

I do not desire to claim herein the process of determining the point of leverage of a polarized body or of neutralizing such body as against the influence of terrestrial magnetism—a preliminary requisite to the said process—as this is claimed in a separate application for patent filed January 19, 1889, Serial No. 296,821.

Having now described my invention, what I claim is—

1. The herein-described mode of determining the value of magnetic, electric, or electro-magnetic forces by weight, which consists in first determining by weight the value of terrestrial magnetism by counterbalancing an equilibrated polarized body as against the influence of such magnetism and utilizing the value obtained as a standard of comparison in weighing other like forces, substantially as and for the purposes specified.

2. The mode of determining the value of magnetic, electric, or electro-magnetic forces, which consists in neutralizing a polarized and equilibrated body against the influence of terrestrial magnetism, subjecting such body to the influence of the force whose value is to be determined, and counterbalancing the power exerted thereby upon said body by a gravital force, as described.

3. The described mode of obtaining standard polarized bodies, which consists in magnetizing equilibrated bodies to a definite power and neutralizing the same as against a definite force of terrestrial magnetism by means of a correspondingly-definite gravital force, substantially as and for the purposes specified.

4. The described mode of obtaining standard polarized bodies, which consists in magnetizing equilibrated bodies to a definite power, placing such bodies in a line due east and west, and neutralizing the same as against a definite power of terrestrial magnetism by means of a correspondingly-definite gravital force, substantially as and for the purposes specified.

In testimony whereof I affix my signature in presence of two witnesses.

ADOLPHUS GIPPERICH.

Witnesses:
JAMES J. SUTTON,
S. McG. FISHER.